UNITED STATES PATENT OFFICE.

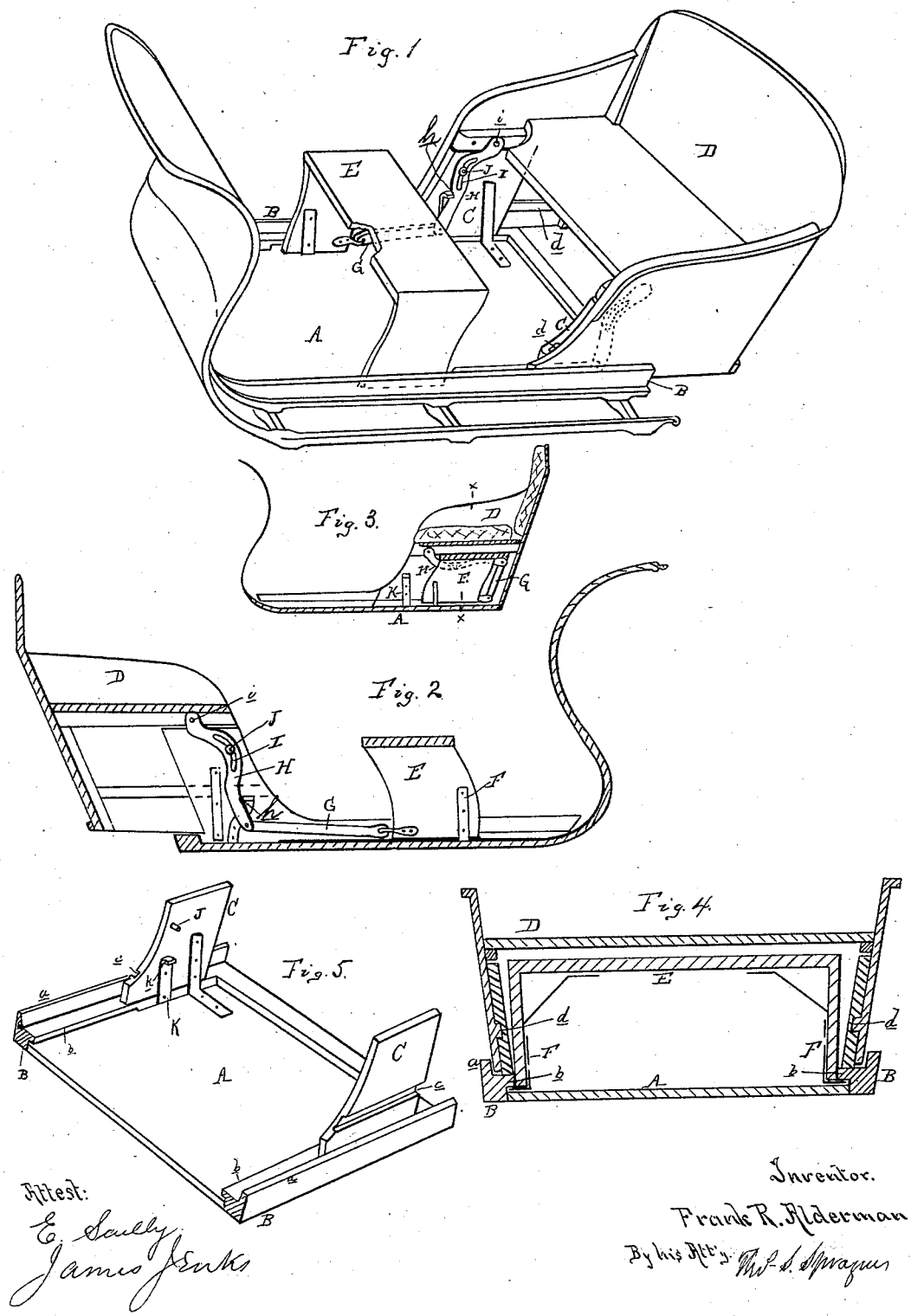

FRANK R. ALDERMAN, OF DETROIT, MICHIGAN, ASSIGNOR TO O. F. HALL, OF SAME PLACE.

VEHICLE-SEAT.

SPECIFICATION forming part of Letters Patent No. 302,371, dated July 22, 1884.

Application filed January 23, 1884. (No model.)

*To all whom it may concern:*

Be it known that I, FRANK R. ALDERMAN, of Detroit, in the county of Wayne and State of Michigan, have invented new and useful Improvements in Vehicle-Seats; and I do hereby declare that the following is a full, clear, and exact description thereof, reference being had to the accompanying drawings, which form a part of this specification.

This invention relates to certain new and useful improvements in vehicle-seats for sleighs or buggies; and the invention consists in the peculiar construction and means employed for changing the seats, so as to form a single or a double seated vehicle, as may be desired, one seat advancing simultaneously with the receding of the other, and in the construction, arrangement, and various combinations of the parts, all as more fully hereinafter set forth.

For convenience, I show my invention as applied to a sleigh of the class commonly known as a "Portland cutter."

Figure 1 is a perspective view showing arrangement of two seats as extended. Fig. 2 is a central longitudinal section of the same. Fig. 3 is a similar view with parts arranged for one seat. Fig. 4 is an enlarged cross-section on line X X, Fig. 3. Fig. 5 is a perspective view of box end with seats removed.

In the accompanying drawings, which form a part of this specification, A represents the bottom of the vehicle, the side rails, B, of which are provided with the vertical flanges $a$ and the horizontal inwardly-projecting flanges $b$, and near the rear end of the bottom there are rigidly secured the standards C, in the outer faces of which there is formed a horizontal channel, $c$, which receives a rib, $d$, on the inner faces of the sides of the seat D, the bottom edges of such seats resting upon the top of the flanges $b$ and between the flanges $a$ of the side rails and the standards C, the seat D being so arranged that it has a free or easy sliding reciprocating motion upon the ribs $d$.

E represents the front seat, the lower ends of the standards of which have rigidly secured to them one or more irons, F, the lower ends of which are bent outwardly, forming a tongue, which engages and slides within a slot or channel between the flange $b$ and the bottom A.

G represents connecting-bars, the forward ends of which are pivotally secured to the standards of the seat E, as shown, the opposite ends being pivotally secured to a curved lever, H, the upper end of which is likewise pivotally secured to the frame of the seat D, as at $i$. In this curved lever is formed a slot, I, with which engages a stud, J, projecting inwardly from the standards C, and is provided with an anti-friction roller, which moves within the slot in the operation of the device.

Assuming that the seats are in position shown in Fig. 3, with the seat D advanced so as to cover the seat E, and it being desired to convert the single-seated vehicle into a two-seated one, the seat E is drawn forward and the seat D is pushed rearward simultaneously therewith, the connecting-levers herein described being so arranged that by the moving of, say, the rear seat, forward from the position shown in Fig. 3, the front seat will be compelled to slide in the reverse direction until the seats assume the positions shown in Figs. 3 and 4, the front seat being entirely hidden under the rear seat in the reverse movement of the parts. To give rigidity to the rear seat when it is extended to its rear position, as shown in Fig. 1, I form a notch, $h$, in the front edge of the levers H, which engage with the stop $k$ upon the upper ends of the irons K, which assist in securing the standards C rigidly to their positions, the engagement of the parts being fully shown in Figs. 1 and 2.

I am aware that vehicle-bodies have heretofore been provided with adjustable seats connected by a system of levers, and therefore do not claim, broadly, a vehicle-body provided with adjustable seats. In all such constructions, as far as I am aware, the seats have been made to slide on top of the sides of the vehicle, in some instances flanged plates being provided for the back seat to slide on. This has been found objectionable for various reasons. I deem it important that the seats be made to slide upon the body bottom, for by this construction the seats are brought nearer the ground, and there is less liability of the vehicle tipping over, which is very likely to occur when the same is made top heavy by having the seat slide on the top of the sides; and besides by my construction the seats are guided and strengthened by the side bars and sides of the vehicle, which is not the case with the constructions above referred to.

What I claim as my invention is—

The combination of the standard C, provided with pin J, and rigidly secured to the bottom A by the irons K, said irons being provided with a stop, $k$, and the lever H, having slot I and notch $h$, substantially as and for the purpose specified.

FRANK R. ALDERMAN.

Witnesses:
E. SCULLY,
H. S. SPRAGUE.